(12) United States Patent
Ekberg et al.

(10) Patent No.: US 7,703,803 B2
(45) Date of Patent: Apr. 27, 2010

(54) SAFETY NET

(75) Inventors: Tomas Ekberg, Göteborg (SE); Niklas Thuresson, Kode (SE)

(73) Assignee: Volvo Lastvagnar AB, Göteborg (SE)

( * ) Notice: Subject to any disclaimer, the term of this patent is extended or adjusted under 35 U.S.C. 154(b) by 205 days.

(21) Appl. No.: 11/817,233

(22) PCT Filed: Mar. 3, 2006

(86) PCT No.: PCT/SE2006/000280

§ 371 (c)(1),
(2), (4) Date: Aug. 28, 2007

(87) PCT Pub. No.: WO2006/093461

PCT Pub. Date: Sep. 8, 2006

(65) Prior Publication Data

US 2008/0111361 A1    May 15, 2008

(30) Foreign Application Priority Data

Mar. 4, 2005   (SE) .................................. 0500509

(51) Int. Cl.
*B60R 21/06* (2006.01)
(52) U.S. Cl. .................... 280/749; 280/748; 296/24.33; 296/24.6; 296/24.43; 296/190.02; 296/190.03; 297/467; 297/474; 297/475; 297/485; 297/487; 5/94; 5/118; 5/424; 5/425; 5/427; 5/429; 5/430
(58) Field of Classification Search .................. 280/748, 280/749; 296/24.33, 24.6, 24.43, 190.02, 296/190.03; 297/467, 474, 475, 485, 487; 5/94, 118, 424, 425, 427, 429, 430
See application file for complete search history.

(56) References Cited

U.S. PATENT DOCUMENTS

| | | | | |
|---|---|---|---|---|
| 3,695,698 A | | 10/1972 | Trump | |
| 5,375,879 A | * | 12/1994 | Williams et al. | 280/749 |
| 5,529,341 A | * | 6/1996 | Hartigan | 280/749 |
| 5,551,726 A | * | 9/1996 | Ament | 280/749 |
| 5,690,355 A | * | 11/1997 | Kleinberg | 280/730.1 |
| 5,876,059 A | * | 3/1999 | Kleinberg | 280/730.1 |
| 5,971,433 A | * | 10/1999 | Ament et al. | 280/749 |
| 6,155,621 A | * | 12/2000 | Nishida et al. | 296/24.4 |

(Continued)

FOREIGN PATENT DOCUMENTS

EP    1069031 A2    1/2001

(Continued)

OTHER PUBLICATIONS

International Search Report for corresponding International Application PCT/SE2006/000280.

*Primary Examiner*—Faye M. Fleming
*Assistant Examiner*—Barry Gooden, Jr.
(74) *Attorney, Agent, or Firm*—WRB-IP LLP

(57) ABSTRACT

A safety restraint system for a vehicle includes a safety net stored in a wall mounted cartridge wherein a guiding bar, securable in a locking mechanism, steers the safety net away from the wall and provides a secured space around a bunk. The safety net is secured adjacent to the bunk using a locking bar. The safety net may be provided with one or several safety belts at least partly attached to the safety net.

13 Claims, 5 Drawing Sheets

U.S. PATENT DOCUMENTS

| | | | |
|---|---|---|---|
| 6,349,986 B1* | 2/2002 | Seel et al. | 296/37.16 |
| 6,405,391 B1* | 6/2002 | Hakansson | 5/118 |
| 6,428,044 B1* | 8/2002 | Ghantae | 280/748 |
| 6,612,606 B1* | 9/2003 | Bergenheim et al. | 280/728.1 |
| 7,097,204 B2* | 8/2006 | Jessup et al. | 280/748 |
| 7,150,471 B2* | 12/2006 | Langhoff et al. | 280/749 |
| 7,207,613 B2* | 4/2007 | Walter et al. | 296/24.4 |
| 2002/0180197 A1* | 12/2002 | Saczalski et al. | 280/749 |
| 2002/0190513 A1* | 12/2002 | Svetlik | 280/749 |
| 2004/0012183 A1* | 1/2004 | Jessup et al. | 280/748 |
| 2005/0023806 A1* | 2/2005 | Higuchi | 280/730.1 |
| 2005/0173909 A1* | 8/2005 | Langhoff et al. | 280/749 |
| 2006/0220365 A1* | 10/2006 | Kwok | 280/749 |
| 2006/0249944 A1* | 11/2006 | Jessup et al. | 280/749 |
| 2007/0018442 A1* | 1/2007 | Kwok | 280/749 |
| 2007/0152436 A1* | 7/2007 | Kwok | 280/749 |
| 2008/0048424 A1* | 2/2008 | Hakansson et al. | 280/749 |

FOREIGN PATENT DOCUMENTS

EP    1147946 A1    10/2001

* cited by examiner

SAFETY NET

BACKGROUND AND SUMMARY

The present invention relates to a safety restraint system for use in a vehicle, and in particular to a safety net for use in relation to a sleeping/resting compartment of a vehicle.

In vehicles containing sleeping and/or resting bunks a safety net is provided for the safety of the person resting during travel. This safety net provides a soft barrier in a direction of travel as seen from the bunk. In case of a crash or rapid deceleration a person present or equipment stored in the same compartment will continue to travel due to the momentum of the object or person and hit the windscreen of the vehicle and/or any other object or person in between with possible injuries for persons in the vehicle compartment both in the resting compartment and in the driving compartment. Also damages are likely to occur for the vehicle.

For this purpose several different solutions for providing a safety net have been suggested in the literature; in many cases the safety net is provided for fixed bunks using for instance a manually mounted net secured using some locking arrangement. The net may be provided in net basket for storage when not in use. In SE516063 a safety net is provided in a storage location underneath the bunk and in SE514565 the net is stored in a cartridge located along the long side of the bunk.

However, many suggested solutions are provided for fixed bunks, i.e. the bunk is always in the same position. These safety net solutions are not suitable for bunks that may be folded against a wall when not in use since the safety net itself and any storage solutions add to the weight of the bunk when provided connected to the bunk. This may in turn increase the complexity of handling of the bunk.

According to an aspect of the present invention, a safety net is stored in a cartridge located in a back wall of the sleeping compartment and the net may be drawn out from this cartridge and positioned and secured to the bunk when in use. A guiding bar is provided to steer the net out from the wall during operation and provide a suitable space behind the net where a person may be secured during rapid deceleration or accidents. With such a solution the safety net system is independent on whether the bunk is foldable or fixed.

In a first aspect of the present invention, a safety restraint system, securing a resting compartment of a vehicle is provided, comprising:
  a storage cartridge;
  a guiding mechanism;
  a safety net secured in one end to the storage cartridge;
  a first locking mechanism for locking the guiding mechanism;
  a second locking mechanism for securing the safety net to or close to a side of the bunk;

wherein the safety net during operation rests on the guiding mechanism and the guiding mechanism is during operation mounted in the first locking mechanism for locking the guiding mechanism in a position spaced apart from the cartridge and between the cartridge and a side of the bunk; the safety net is during operation further mounted in the second locking mechanism securing the resting compartment.

The safety restraint system may further comprise at least one belt and each belt is steered through a belt guide loop arranged on the guiding mechanism.

The guiding mechanism may be locked in a position substantially above a side of a bunk, the bunk is located adjacent to a wall in the compartment, and wherein the side of the bunk is located on an opposing side of the bunk from the wall;

The safety net, the wall, and the bunk may together define a box like shaped compartment under operation wherein a person is secured with respect to a direction of travel of the vehicle.

The safety net may comprise a mesh structure and may be manufactured in at least one of nylon, polyester, polypropylene, or other polymeric substances or compositions thereof, or natural fibers such as from cotton or compositions of different natural fibers or polymeric substances.

The safety net may be at least partly secured to the at least one belt.

The safety net may be attached to a locking bar securable close to the bunk in the second locking mechanism.

The storage cartridge may be located in a back wall of the resting compartment or the storage cartridge may be located on a back wall of the resting compartment.

The guiding mechanism may comprise a guiding bar with end pieces with increased radius. The first locking mechanism may comprise an insertion structure in a base structure and a slot structure steering the guiding bar to an operational position, a stop structure is provided for stopping the guiding bar from being self-released during a rapid deceleration.

The safety net may be connected to a tightening mechanism for tightening the safety net in an event of rapid deceleration of the vehicle.

The safety net may be stored inside the storage cartridge during storage and the belt may be stored inside the storage cartridge during storage.

The guiding mechanism may be mounted on at least one steering arm telescopically extendable from the cartridge or a wall.

The guiding mechanism may be mounted on at least one foldable arm extendable from the cartridge or the wall.

In another aspect of the present invention, a vehicle with a safety restraint system is provided, wherein the safety restraint system secures a resting compartment of the vehicle, the safety restraint system comprising: a storage cartridge; a guiding mechanism; a safety net secured in one end to the storage cartridge; a first locking mechanism for locking the guiding mechanism; a second locking mechanism for securing the safety net to or close to a side of the bunk; wherein the safety net during operation rests on the guiding mechanism and the guiding mechanism is during operation mounted in the first locking mechanism for locking the guiding mechanism in a position spaced apart from the cartridge and between the cartridge and a side of the bunk; the safety net is during operation further mounted in the second locking mechanism securing the resting compartment.

These and other aspects of the invention will be apparent from and elucidated with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which:

FIG. 2 illustrates a locking mechanism according to the present invention, wherein

DETAILED DESCRIPTION

The present invention will be exemplified through an example using a safety restraint system in a commercial vehicle, such as a truck or bus.

Figure 1A:
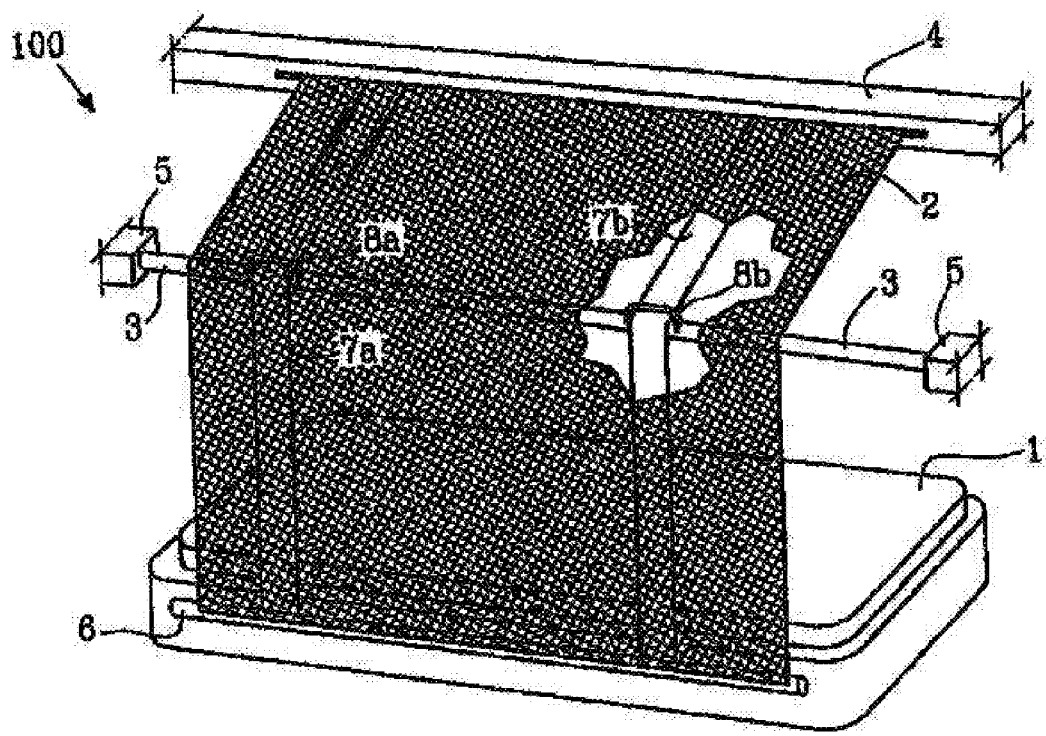
FIG. 1a illustrates a perspective view of a system according to the present invention.
Figure 1B:
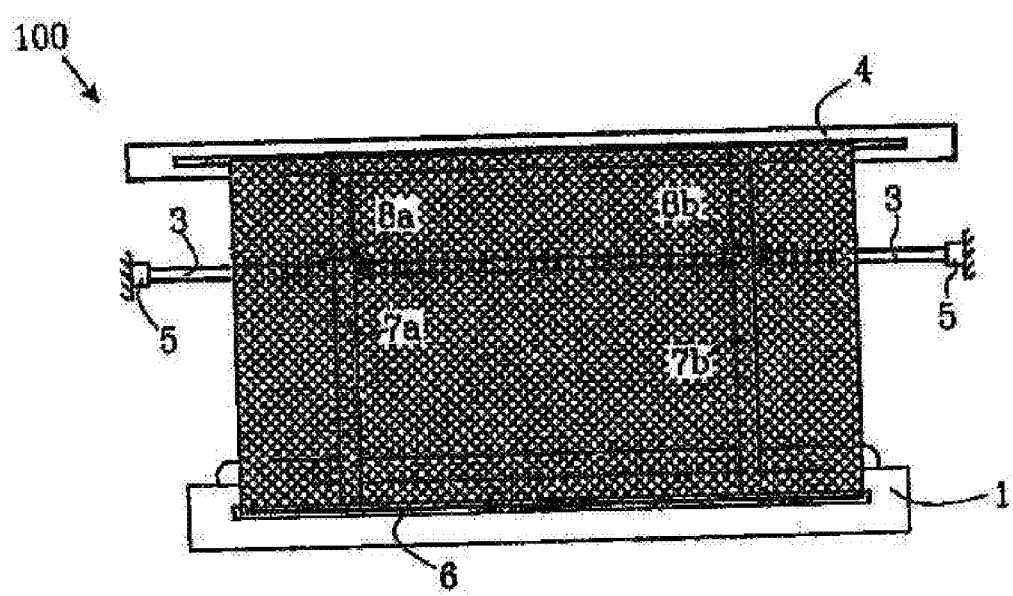
FIG. 1b illustrates a front view of a system according to the present invention.
Figure 1C:
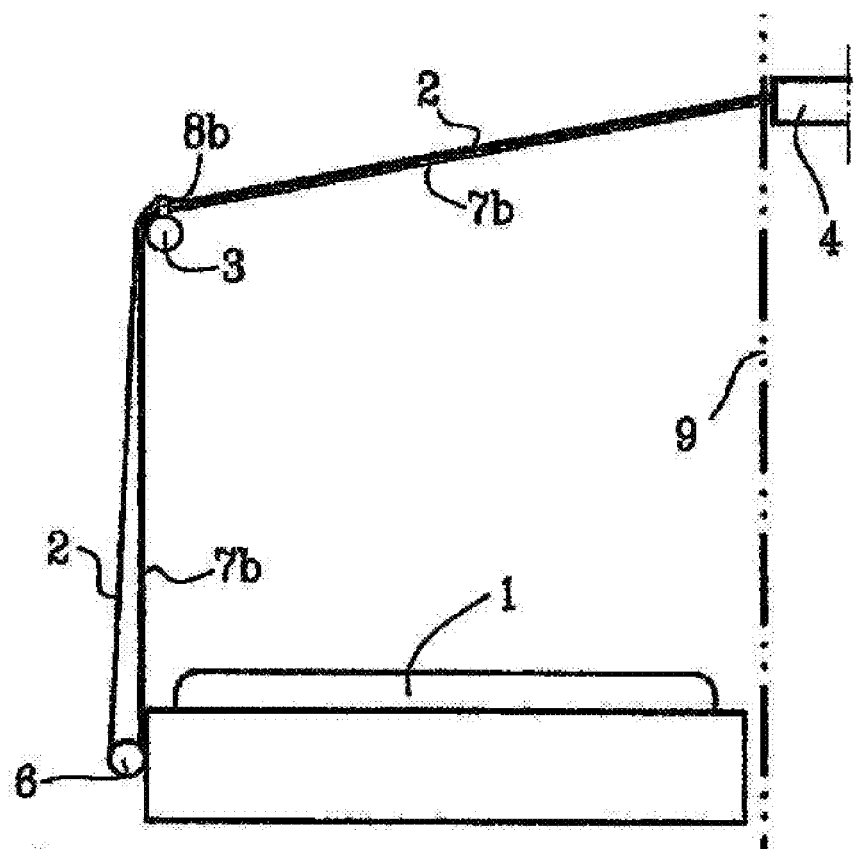
FIG. 1c illustrates a side view of a system according to the present invention.

FIG. 1a illustrates a perspective view of a first embodiment of a safety restraint system 100 in operational mode for a bunk 1 in a vehicle, comprising a safety net 2, a guiding bar 3, a safety net cartridge 4, locking mechanisms 5, locking bar 6, belts or safety belts 7a and 7b, and belt guide loops 8a and 8b. FIG. 1b is a front view of the system and FIG. 1c is a side view of the same system. In FIG. 1c the cartridge location 4 inside a back wall 9 of the vehicle resting compartment is shown; however, the cartridge 4 may be located on the wall 9 instead of in a niche in the wall 9 as illustrated in FIG. 1c.

During use the safety net 2 with the safety belts 7a and 7b are mounted over the bunk and the guiding bar 3 lifts the safety net and safety belts 7a, 7b providing enough space for at least one person to fit inside the thus provided restrained compartment. The guiding bar 3 is secured by mounting the guiding bar to at least one locking mechanism 5 provided for instance in or on a side wall or walls of the vehicle compartment. The safety belts 7a and 7b is optional and may be provided for increased mechanical strength and/or regulatory purposes. Also it should be noted that the invention is not limited to two safety belts, one or several safety belts may be used. The safety net 2 may be strong enough to be able to without the safety belts 7a and 7b handle the mechanical forces present in case of rapid deceleration or a crash.

The safety belts 7a, 7b may provide stability to the system also with respect to handling, which may be even further enhanced through the use of the belt guide loops 8a, 8b.

The guiding bar 3 may be provided with an end piece (212 in FIG. 2c) with increased radius of the guiding bar 3 at the ends of the bar.

In the first embodiment of the present invention the safety belts 7a and 7b are provided through a steering mechanism, belt guide loops 8a and 8b which will be described in more detail below with reference to FIGS. 3 and 4. The safety net 2 glides over the belt guide loops 8a and 8b and the belt glides through the belt guide loops 8a, 8b. The safety net 2 and safety belts 7a and 7b are connected to a locking bar 6 for securing the safety net and safety belts to the bunk 1 or any other structure adjacent or in the vicinity of the bunk 1, in order to provide a secured resting compartment. The locking bar 6 is locked using any suitable locking mechanism (not shown) as appreciated by the person skilled in the art, including, but not limited to, a similar locking mechanism as for the guiding bar 3, a clamping device, quick lock systems, or a U shaped structure, mounted on the longitudinal direction of the bunk 1, receiving the locking bar 6 and using, for instance, the spring mechanism connected to the safety net 2 and safety belts 7a and 7b to tighten the placement of the locking bar 6 into place.

The U shaped structure may have the opening downwards and/or slightly tilted towards the bunk 1 side, thus providing a locking function The locking bar 6 may be replaced by several locking devices attached to the safety net 2 and/or safety belts 7a and 7b. One advantage of using a locking bar 6 is the possibility of easy locking and handling of the safety net 2 and safety belts 7a, 7b to the bunk 1 using one locking mechanism (not shown) as compared to using several locking devices attached to the safety net 2, wherein each locking device need to be locked separately.

During storage of the safety system 100, the safety net cartridge 4 has a spring mechanism to reel in the safety net 2, the safety belts 7a and 7b, the guiding bar 3, and locking bar 6, providing a clean environment and convenient storage of the system when not in use. It is also possible to have the guiding bar 3 and locking bar 6 remaining outside and adjacent to the cartridge 4. In the first embodiment the safety net 2 and safety belts 7a and 7b are fixed to the locking bar 6 and can slide over/through the guiding bar 3.

During assembly into operating position of the safety system 100, the operator stands in front of and facing the back wall 9 and pulls the guiding bar 3 towards him self and secures the guiding bar 3 in the locking mechanism(s) 5. Thereafter, the operator steps into the resting compartment and turns around (now facing the opposite direction: the windscreen) pulls the locking bar 6 down towards the bunk 1 and secures the locking bar to the locking mechanism (not shown) adjacent to the bunk 1. Since the safety net 2 and safety belts 7a and 7b are fixed to the locking bar 6 they travel the same route as the locking bar 6 and will thus have secured the resting compartment when the locking bar 6 is secured.

FIG. 2 illustrates a locking mechanism 200 (denoted 5 in FIG. 1) locking the guiding bar 3. In a first embodiment of the present invention, two such locking mechanisms are used, one on each side of the bunk 1, located on or in the side walls of the vehicle compartment. The locking mechanism 200 comprise an insertion structure 201 allowing the guiding bar 203 (3 in FIG. 1a) to enter with end pieces with an increased radius than the major part of the bar 3. A steering slot 202 is provided where spring forces acting on the safety belts 7a and 7b (and safety net 2) will urge the bar 3 to the end wall of the steering slot 202, keeping the guiding bar 3 in place during normal operation. A shoulder structure 210 provides a stop in a forward direction if a rapid deceleration or crash occurs. The locking structure may be provided in a base structure 205 mountable in or on a wall. Other locking mechanisms may be used as understood by the person skilled in the art. The space 211 under the surface part of steering slot 202 is wider in order provide space for the increased radius end piece 212 of the guiding bar 203. The arrow indicated by numeral 215 illustrates the direction of travel when the vehicle travels in a forward direction.

Figure 2A:
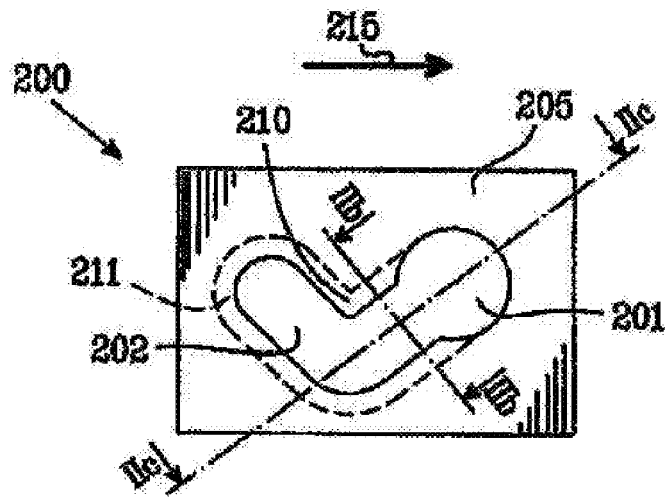
FIG. 2a is a front view, FIG. 2b a side view in cross section as indicated by line Mb, and FIG. 2c a side view in cross section as indicated by line Nc.
Figure 2B:
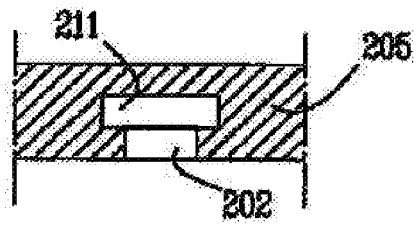

FIG. 2b is side view of a cross section as indicated by line 1ib in FIG. 2a. The steering slot 202 and the wider slot 211 "underneath" for providing room for the guiding bar 3 end piece 212 is illustrated. The base structure 205 is also illustrated.

Figure 2C:
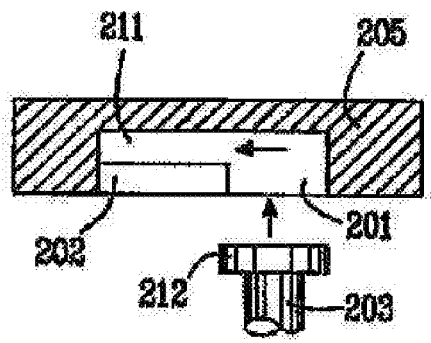

FIG. 2c illustrates another side view in cross section, this time indicated by line Mc in FIG. 2a. The base structure 205 has an insertion structure 201 wherein a bar 203 with a wider end piece 212 may be inserted. By moving the bar 203 to the left in the figure and inwards in steering slot 202, the wider end piece 212 may be locked.

Figure 2D:
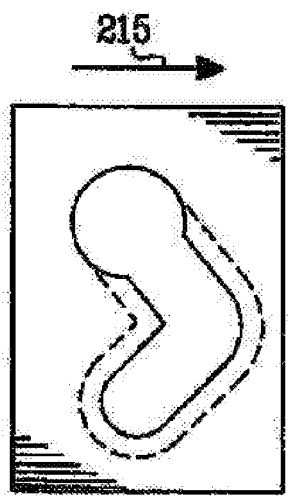
FIG. 2d illustrates an alternative location of the locking mechanism.

In another embodiment of the locking mechanism 200, it is rotated 90° as compared to above description (i.e. rotate FIG. 2a 90° anti-clock-wise) with respect to the direction of travel 215, meaning that the insertion structure 201 is placed top wise of the locking mechanism 200, this is illustrated in FIG. 2d. The guiding bar 203 will then fall down to the end of steering slot 203. The stop shoulder 210 provides a stop in the upward direction in case of a rapid deceleration. Other orientations of the locking mechanism may be implemented; the invention is not limited to these two examples of orientation any angular orientation there between and also other angular orientations may be utilized as long as the guiding bar 203 is locked in case of a rapid deceleration and during normal secured operation.

The spring mechanism used for reeling in the system (net 2, belt 7a, 7b and bars 3, 6) into the cartridge 4 during storage may be provided with an active control for rapid and controlled tightening of the safety net and/or safety belts in case of a collision or rapid deceleration, such a feature is often provided for ordinary safety belts for seats. This active control may also be directly attached to the net/belt system overriding the spring mechanism in case of a collision or rapid deceleration.

Figure 3:
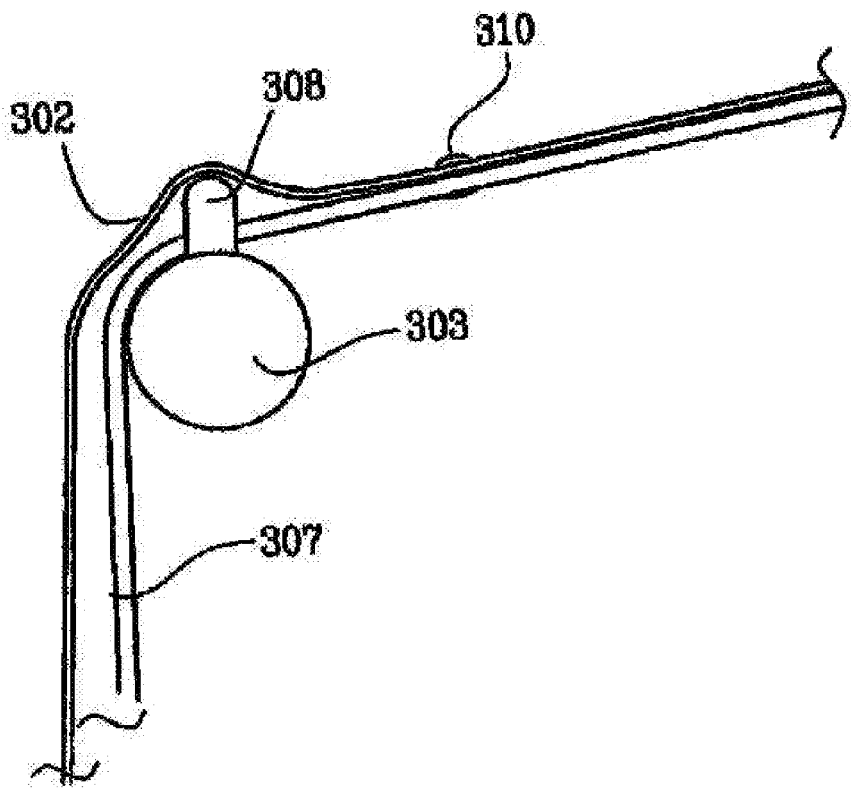
FIG. 3 illustrates a detail of a system according to a first aspect of the present invention.

FIG. 3 shows a cross section of the guiding bar 303 (denoted 3 in FIG. 1a), at a location where one of the belt guide loops 308 (8a and 8b in FIG. 1a) are located, with the safety net 302, and safety belt 307 also shown. The safety net 302 steers above the belt guide loop 308 while the safety belt 307 steers through the belt guide loop 308. The guiding bar 303 is shown with circular shape; however, the guiding bar 303 may be in any suitable shape as understood by the person skilled in the art, for instance a half cut circular shape, rectangular shape, triangular shape, and so on. The safety net 302 may be fixed to the belt 307 along a portion of the length of the belt 307 in order to keep the net 302 in order. The net 302 may be attached (e.g. by sewing, gluing, or melting) at one or several points 310 to the belt 307 or along the entire length of the portion where net 302 and belt 307 are fixed to each other.

Figure 4:
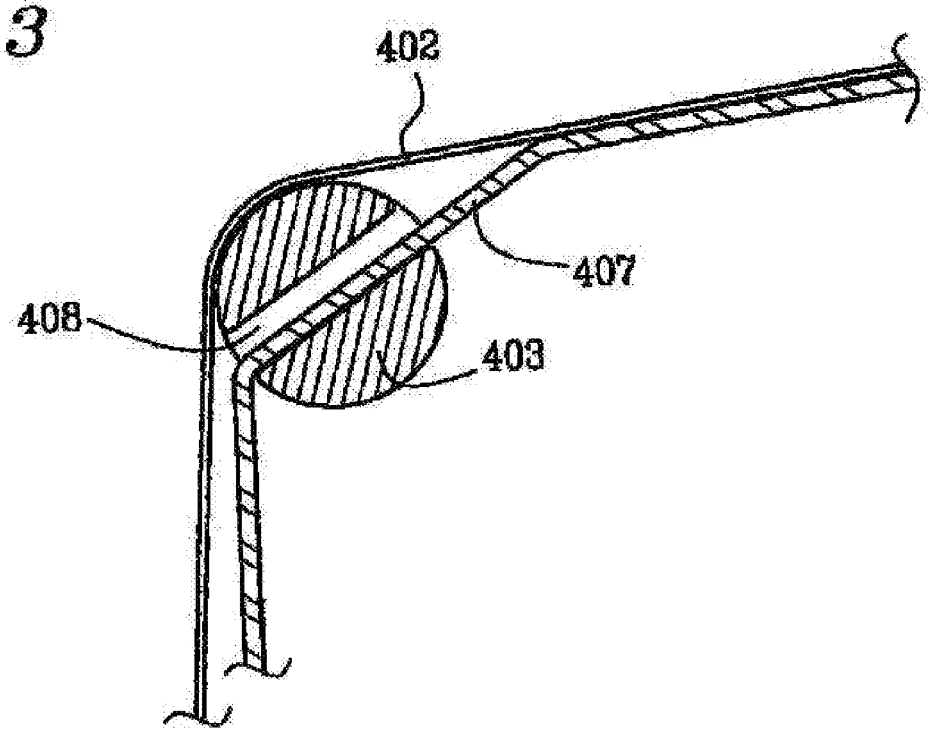
FIG. 4 illustrates a detail of a system according to a second aspect of the present invention.

FIG. 4 shows another embodiment of the guiding bar 403 (denoted 3 in FIG. 1a). In this case a slot 408 in the bar 403 it self provide the belt 407 guiding function. The safety net 402 slides over the bar. As in the previous embodiment, as illustrated by FIG. 3, the guiding bar 403 may be shaped in any suitable shape as understood by the person skilled in the art.

The materials of the included materials may be any suitable for their respective functions, for instance the guiding bar 3, now referring to FIG. 1a, may be made of a metallic substance (in composition or as a single material) or any other material strong enough to mechanically withstand forces present in e.g. a vehicle crash. The safety net 2 and belt 7a, 7b may be made of suitable materials having elastic properties allowing for mechanical strength while at the same time being soft enough to not damage a body slamming into the material in case of a rapid deceleration (such as during a collision). Such materials include, but are not limited to, nylon, polyester, polypropylene, or other polymeric substances or compositions thereof, or natural fibers such as from cotton or compositions of different natural fibers and/or polymeric substances.

Figure 5:
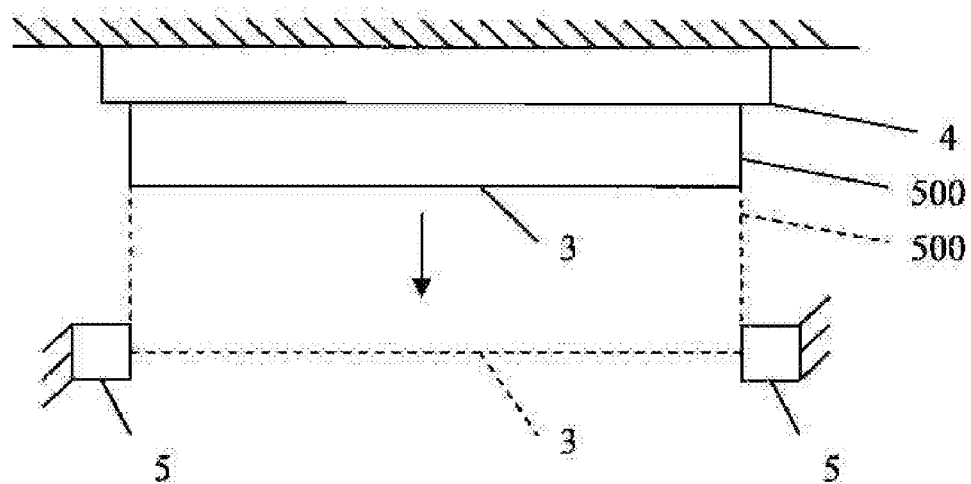
FIG. 5 schematically shows the guiding bar with a telescoping steering arm according to an aspect of the present invention.
Figure 6:
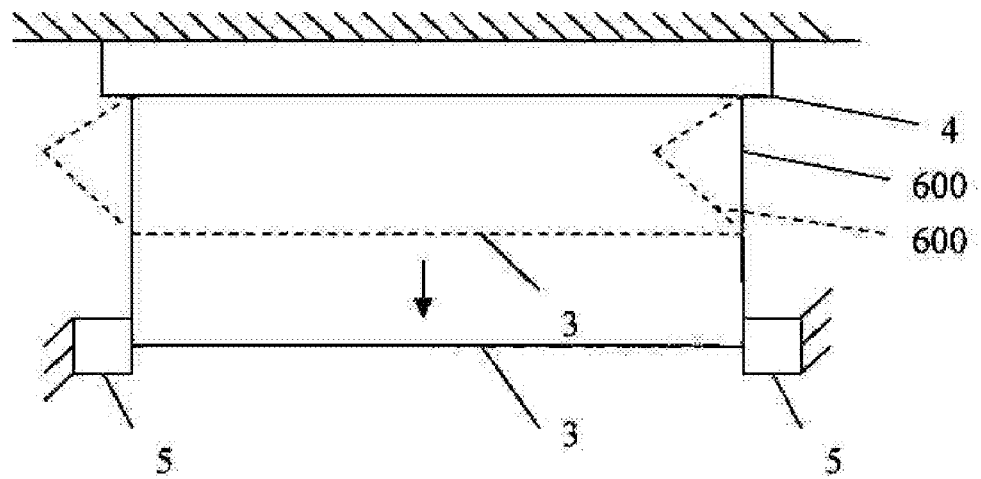
FIG. 6 schematically shows the guiding bar with a folding steering arm according to an aspect of the present invention.

The guiding bar 3 may also be designed in other ways in order to provide the function of locking a guiding mechanism spaced apart from the cartridge 4 or wall 9. This can be achieved by for instance, but not limited to, one or several telescopically extendable steering arms 500 that can be mounted in the cartridge or in the wall as seen in FIG. 5. Another solution can be at least one foldable arm 600 that can extend from the cartridge or wall by being stretched out, much like as is provided in awning type arrangements as seen in FIG. 6. At the end of the at least one steering arm or foldable arm a bar 3 can be attached to provide stability along the long side of the bunk 1. Using these two different types of solutions it is possible to provide the guiding mechanism with an automatic and/or motorized deployment during mounting.

In the above mentioned embodiments of the present invention the bunk 1 has been illustrated lying with a long side of the bunk perpendicular to a direction of travel of the vehicle, but it should be understood by the person skilled in the art that the bunk 1 may be located with the long side of the bunk 1 in the direction of travel of the vehicle. This may be suitable in a use of the present invention in a bus for instance.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented by means of both hardware and software, and that several "means" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A safety restraint system, securing a resting compartment of a vehicle, comprising:
    a storage cartridge;
    a guiding mechanism comprising a guiding bar with end pieces;
    a safety net secured in one end to the storage cartridge;
    a first locking mechanism for locking the guiding mechanism;
    a second locking mechanism comprising a locking bar for securing the safety net proximate a side of bunk; and
    at least one belt, the at least one belt being steered through a belt guide loop arranged on the guiding mechanism,
    wherein the safety net during operation rests on the guiding mechanism the guiding mechanism during operation is mounted in the first locking mechanism for locking the guiding mechanism in a position spaced apart from the cartridge and between the cartridge and the side of the bunk along a path of the net, and the safety net during operation is attached to the locking bar, and, during storage, the safety net is detached from the locking bar and stored inside the storage cartridge.

2. The safety restraint system according to claim 1, wherein the guiding mechanism is locked in a position substantially above a side of the bunk, the bunk is located adjacent to a wall in the compartment, and wherein the side of the bunk is located on an opposing side of the bunk from the wall.

3. The safety restraint system according to claim 2, wherein the safety net, the wall, and the bunk together define a box shaped compartment under operation wherein a person is secured with respect to a direction of travel of the vehicle.

4. The safety restraint system according to claim 1, wherein the safety net comprises a mesh structure made of at least one of nylon, polyester, polypropylene, or other polymeric substance and natural fibers.

5. The safety restraint system according to claim 1, wherein the safety net is at least partly secured to the at least one belt.

6. The safety restraint system according to claim 1, wherein the storage cartridge is located on a back wall of the resting compartment.

7. The safety restraint system according to claim 1, wherein the storage cartridge is located on a back wall of the resting compartment.

8. The safety restraint system according to claim 1, wherein the first locking mechanism comprises an insertion structure in a base structure and a slot structure steering the guiding bar to an operational position, a stop structure being provided for stopping the guiding bar from being self- released during a rapid deceleration.

9. The safety restraint system according to claim 1, wherein the safety net is connected to a tightening mechanism for tightening the safety net in an event of rapid deceleration of the vehicle.

10. The safety restraint system according to claim 1, wherein the belt is stored inside the storage cartridge during storage.

11. A safety restraint system, securing a resting compartment of a vehicle, comprising:
- a storage cartridge;
- a guide mechanism;
- a safety net secured in one end to the storage cartridge;
- a first locking mechanism for locking the guiding mechanism;
- a second locking mechanism for securing the safety net proximate a side of a bunk;
- wherein the safety net during operation rests on the guiding mechanism and the guiding mechanism during operation is mounted in the first locking mechanism for locking the guiding mechanism in a position spaced apart from the cartridge and between the cartridge and the side of the bunk along a path of the net and the safety net is during operation is further mounted in the second locking mechanism securing the resting compartment, and wherein the guiding mechanism is mounted on at least one steering arm telescopically extendable from the cartridge or a wall.

12. A safety restraint system, securing a resting compartment of a vehicle, comprising:
- a storage cartridge;
- a guiding mechanism;
- a safety net secured in one end to the storage cartridge;
- a first locking mechanism for locking the guiding mechanism;
- a second locking mechanism for securing the safety net proximate a side of a bunk;
- wherein the safety net during operation rests on the guiding mechanism and the guiding mechanism during operation is mounted in the first locking mechanism for locking the guiding mechanism in a position spaced apart from the cartridge and between the cartridge and the side of the bunk along a path of the net and the safety net during operation is further mounted in the second locking mechanism securing the resting compartment, and wherein the guiding mechanism is mounted on at least one foldable arm extendable from the cartridge or a wall.

13. A vehicle with a safety restraint system, securing a resting compartment of the vehicle, the safety restraint system comprising:
- a storage cartridge;
- a guiding mechanism comprising a guiding bar with end pieces;
- a safety net secured in one end to the storage cartridge;
- a first locking mechanism for locking the guiding mechanism;
- a second locking mechanism comprising a locking bar for securing the safety net proximate a side of a bunk; and
- at least one belt, the at least one belt being steered through a belt guide loop arranged on the guiding mechanism,
- wherein the safety net during operation rests on the guiding mechanism, the guiding mechanism during operation is mounted in the first locking mechanism for locking the guiding mechanism in a position spaced apart from the cartridge and between the cartridge and the side of the bunk along a path of the net, and
- the safety net being, during operation, attached to the locking bar, and, during storage, the safety net is detached from the locking bar and stored inside the storage cartridge.

* * * * *